US011433488B2

(12) United States Patent
Henry et al.

(10) Patent No.: US 11,433,488 B2
(45) Date of Patent: Sep. 6, 2022

(54) GAS DISPERSION FOR ADDITIVE MANUFACTURING

(71) Applicant: GKN Aerospace North America, Inc., Hazelwood, MO (US)

(72) Inventors: William Chad Henry, Hazelwood, MO (US); Mark Evers, Hazelwood, MO (US)

(73) Assignee: GKN Aerospace St. Louis LLC, Hazelwood, MO (US)

( * ) Notice: Subject to any disclaimer, the term of this patent is extended or adjusted under 35 U.S.C. 154(b) by 491 days.

(21) Appl. No.: 15/922,185

(22) Filed: Mar. 15, 2018

(65) Prior Publication Data

US 2019/0283187 A1  Sep. 19, 2019

(51) Int. Cl.
| | | |
|---|---|---|
| *B23K 26/70* | (2014.01) | |
| *B23K 26/14* | (2014.01) | |
| *B23K 26/142* | (2014.01) | |
| *B33Y 40/00* | (2020.01) | |

(52) U.S. Cl.
CPC .......... *B23K 26/703* (2015.10); *B23K 26/142* (2015.10); *B23K 26/1476* (2013.01); *B33Y 40/00* (2014.12)

(58) Field of Classification Search
CPC .......... B22F 2003/1056; B22F 3/1055; B23K 26/142; B23K 26/1476; B23K 26/342; B23K 26/703; B33Y 30/00; B33Y 40/00

USPC .............. 219/74, 75, 136, 121, 124.34, 125; 419/9, 26, 55

See application file for complete search history.

(56) References Cited

U.S. PATENT DOCUMENTS

| | | | | |
|---|---|---|---|---|
| 4,532,406 A | * | 7/1985 | Povlick | B23K 9/0956 219/124.34 |
| 6,534,745 B1 | * | 3/2003 | Lowney | B23K 26/34 219/121.84 |
| 10,350,707 B2 | * | 7/2019 | Pan | B23K 26/1464 |
| 10,537,966 B2 | * | 1/2020 | Sasaki | B23K 15/0026 |
| 2015/0048071 A1 | * | 2/2015 | Shioji | B23K 26/703 219/121.84 |
| 2015/0285504 A1 | * | 10/2015 | Melton | B23K 26/702 60/737 |
| 2016/0318105 A1 | * | 11/2016 | Gerking | B22F 9/082 |
| 2017/0329092 A1 | * | 11/2017 | Sanders | G02B 6/3813 |
| 2019/0047089 A1 | * | 2/2019 | Riemann | B22F 10/20 |

* cited by examiner

*Primary Examiner* — Tu B Hoang
*Assistant Examiner* — Vy T Nguyen
(74) *Attorney, Agent, or Firm* — Bejin Bieneman PLC

(57) ABSTRACT

A gas-dispersion apparatus for an additive-manufacturing apparatus includes a pipe defining an axis, an outlet, and a cooling tube coiled about the pipe. The pipe includes a passageway along the axis, and the pipe extends from a first end to a second end. The outlet is positioned to discharge gas into the passageway at the first end. The first end is attachable to a laser so that a beam emitted by the laser travels along the axis.

14 Claims, 8 Drawing Sheets

GAS DISPERSION FOR ADDITIVE MANUFACTURING

BACKGROUND

Additive manufacturing is a process of manufacturing parts by successively depositing work material in layers. A manufacturing device may deposit work material in an already molten state, or the device may melt work material as it is being deposited. An example of depositing molten work material is fused deposition modeling, which involves extruding, from a nozzle, a bead of material that immediately hardens. Two examples of melting a solid work material include laser metal deposition-wire (LMD-w), which uses a laser to melt a continuously fed wire; and laser metal deposition-powder (LMD-p), which uses a laser to melt a metal powder that is being continuously fed. Other types of additive manufacturing use powder beds rather than continuously feeding powder.

As the work material is deposited, debris such as dust and particles of work material are generated, and the debris may drift and land on components of the additive-manufacturing apparatus. Heat is also generated, and the heat may degrade components of the additive-manufacturing apparatus over time.

SUMMARY

A gas-dispersion apparatus for an additive-manufacturing apparatus includes a pipe defining an axis, at least one outlet, and a cooling tube coiled about the pipe. The pipe includes a passageway along the axis, and the pipe extends from a first end to a second end. The outlet is positioned to discharge gas into the passageway at the first end. The first end is attachable to a laser so that a beam emitted by the laser travels along the axis.

A cross-sectional area of the passageway at the second end may be smaller than at the first end. The passageway may be tapered from the first end to the second end.

The pipe and the cooling tube may be integral.

The cooling tube may be coiled external to the pipe.

The cooling tube may be attachable to a coolant source.

The outlet may be fluidly connectable to a source of pressurized nonreactive gas. The gas-dispersion apparatus may further include a nozzle fluidly connectable to the source of pressurized nonreactive gas and attachable to a source of work material. The nozzle may be aimed at the axis.

The gas-dispersion apparatus may further include an air-blade slot fluidly connectable to the source of pressurized nonreactive gas. The air-blade slot may be aimed at the axis.

The nonreactive gas may be argon.

The gas-dispersion apparatus may further include a plurality of outlets including the outlet, and the outlets may be positioned to discharge gas into the passageway at the first end. The outlets may be oriented in an at least partially circumferential direction relative to the pipe.

The outlets may be oriented to discharge gas in a swirling pattern in the passageway.

The outlets may be substantially equally circumferentially spaced about the first end of the pipe.

DETAILED DESCRIPTION

Figure 1A:
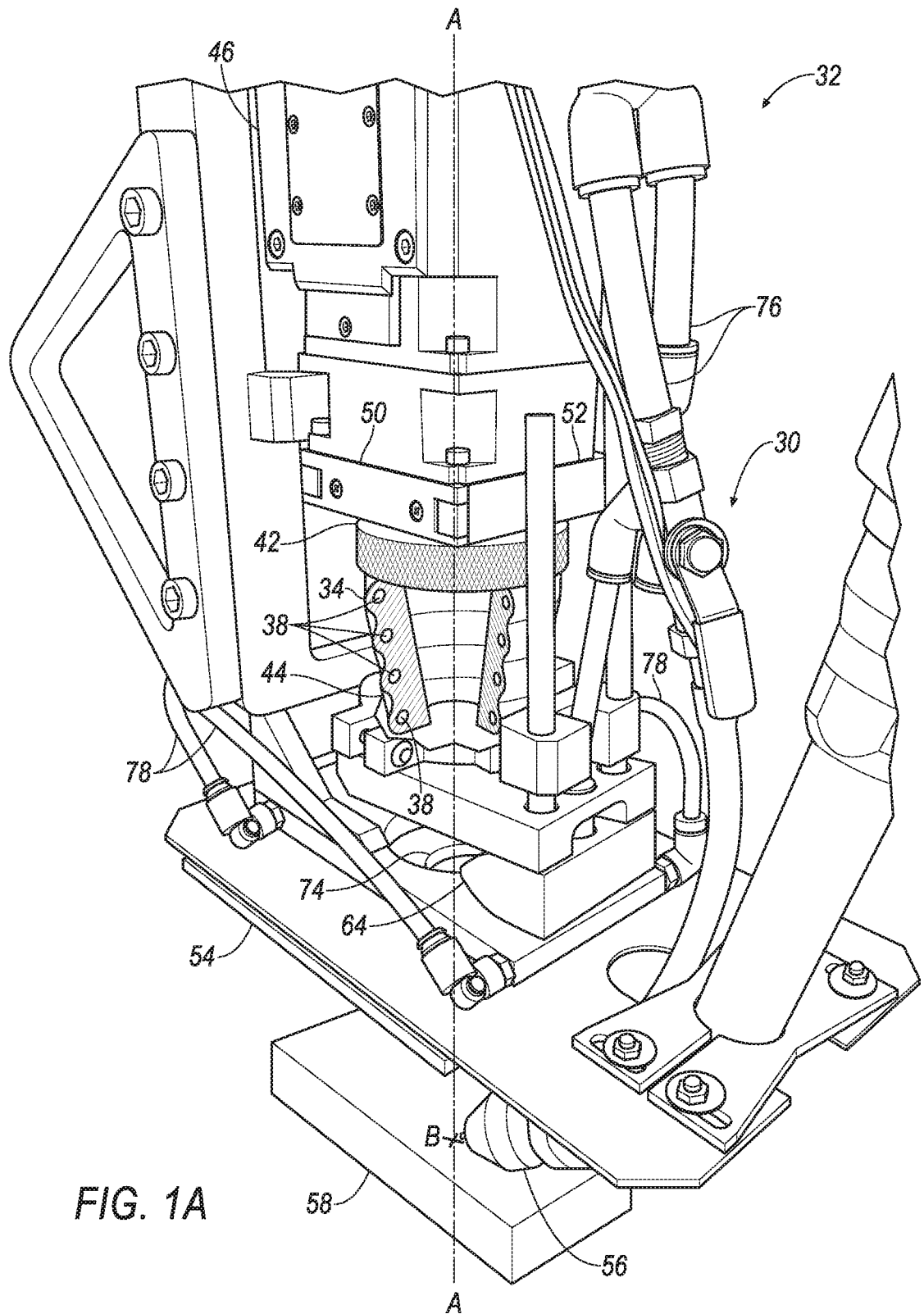
FIG. 1A is a perspective view of an example additive-manufacturing apparatus with a portion of an example pipe cut away for illustration.

With reference to the Figures, wherein like numerals indicate like items throughout the several views, a gas-dispersion apparatus 30 for an additive-manufacturing apparatus 32 includes a pipe 34 defining an axis A, at least one outlet 36 (see FIG. 5), and a cooling tube 38 (see FIG. 10) coiled about the pipe 34. The pipe 34 includes a passageway 40 along the axis A (see FIG. 5), and the pipe 34 extends from a first end 42 to a second end 44 of the pipe 34. The outlet 36 is positioned to discharge gas into the passageway 40 at the first end 42. The first end 42 is attachable to a laser 46 so that a beam emitted by the laser 46 travels along the axis A (see FIGS. 1A-2).

Figure 3:
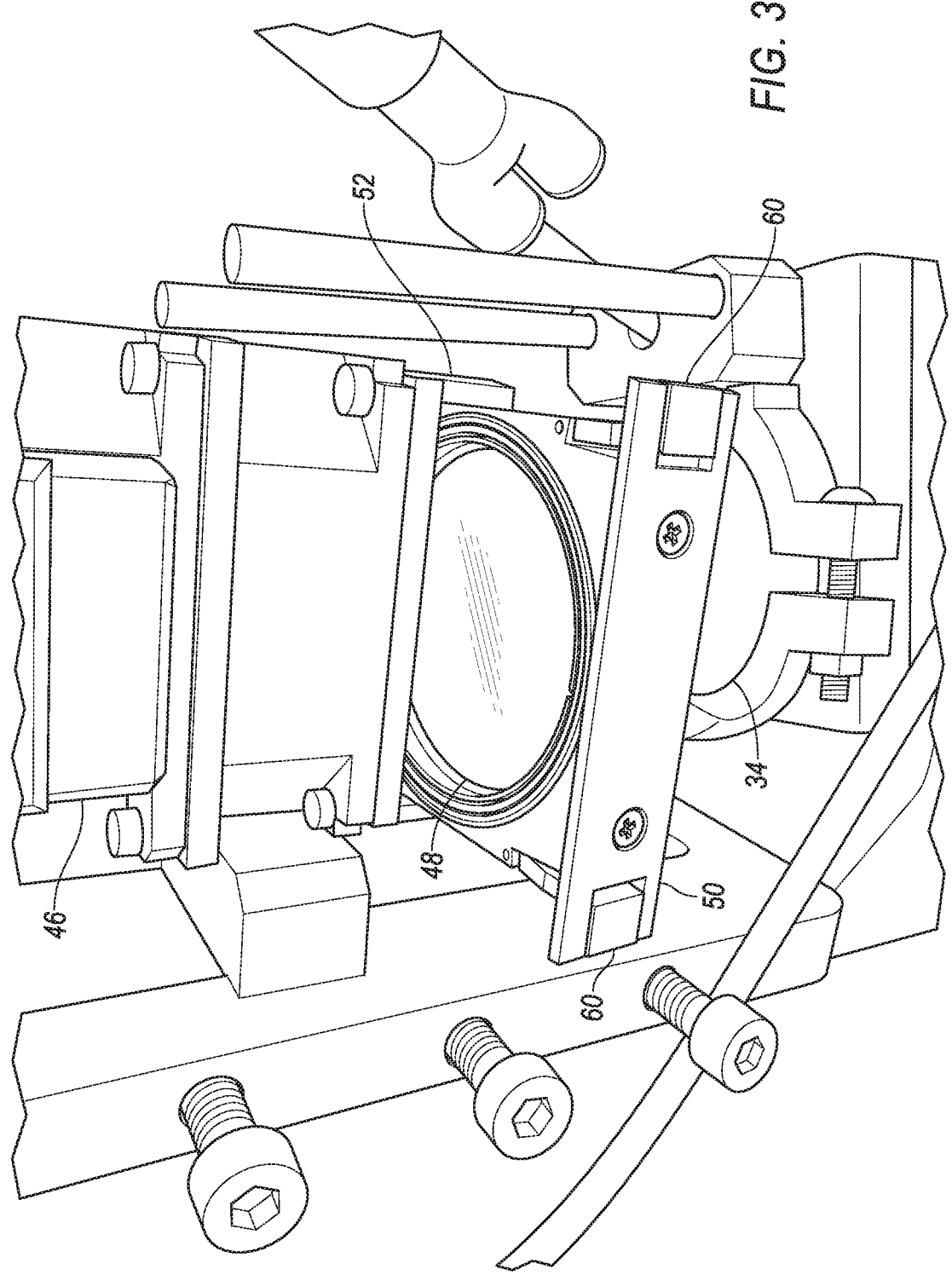
FIG. 3 is a perspective view of a portion of the additive-manufacturing apparatus of FIG. 1 with a cover slide in an ejected position.
Figure 4:
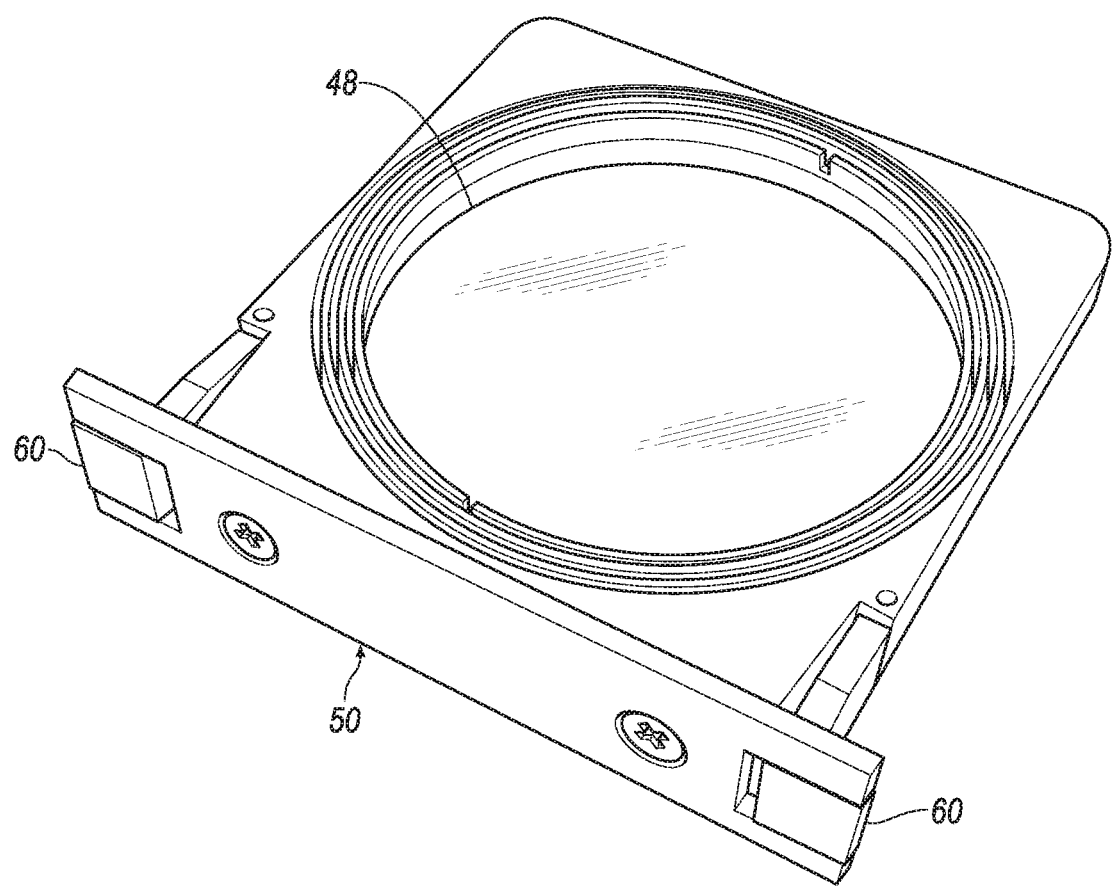
FIG. 4 is a perspective view of the cover slide of FIG. 2.

The gas-dispersion apparatus 30 can reduce the amount of debris and heat that reach a lens 48 or the laser 46 of the additive-manufacturing apparatus 32 (see FIGS. 3-4). The at least one outlet 36 discharges gas that travels down the passageway 40 from the first end 42 to the second end 44. The pressure of the gas helps prevent debris from the additive-manufacturing process from traveling toward the lens 48 and the laser 46. The cooling tube 38 cools the gas in the pipe 34, and reduces the amount of waste heat from the additive-manufacturing process traveling toward the lens 48 and the laser 46. Because of the reduced debris and heat, the laser 46 may need repair or replacement less often, and a cover slide 50 containing the lens 48 may need replacement less often, both reducing cost and downtime.

Figure 1B:
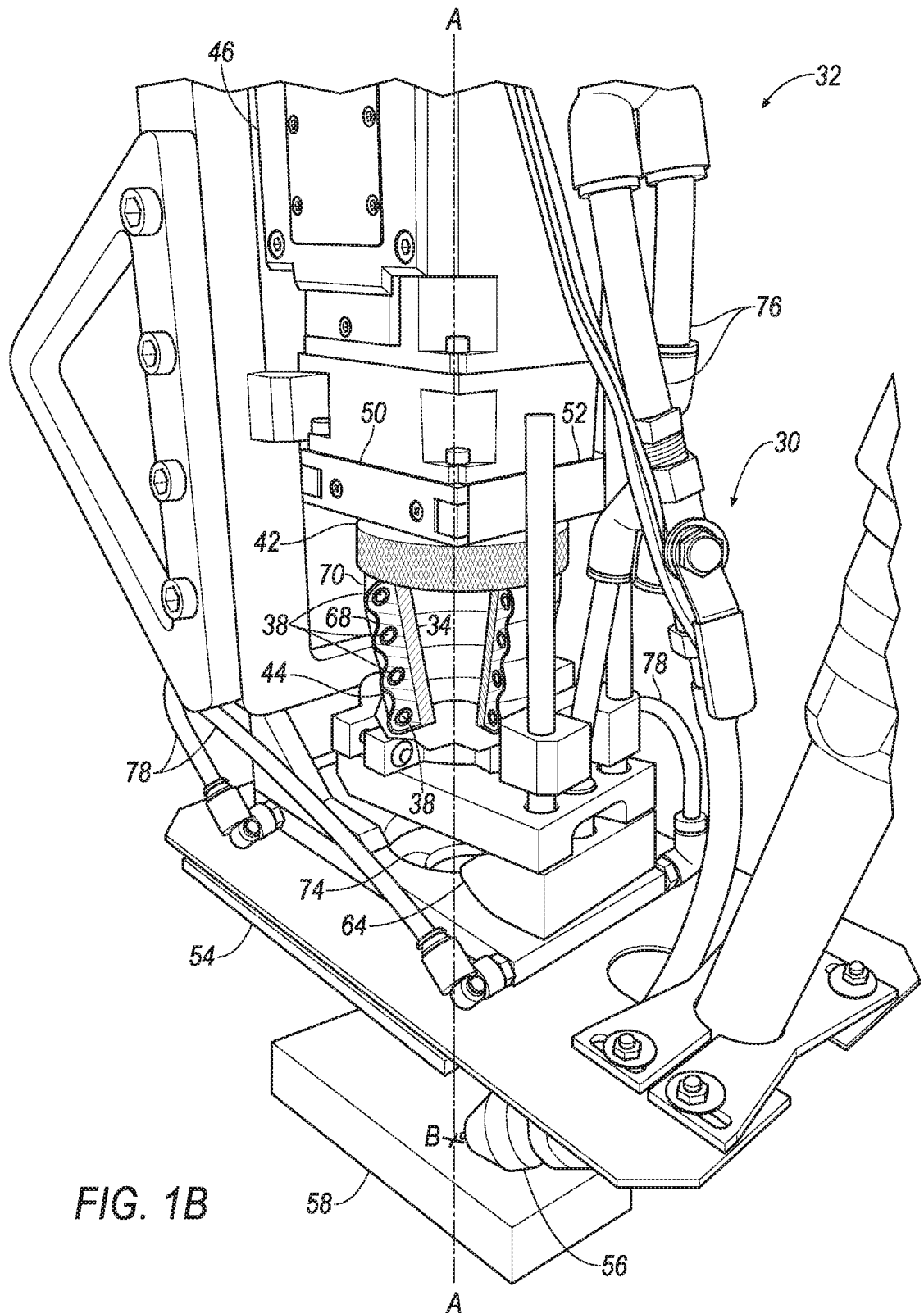
FIG. 1B is a perspective view of the additive-manufacturing apparatus with a portion of another example pipe cut away for illustration.
Figure 2:
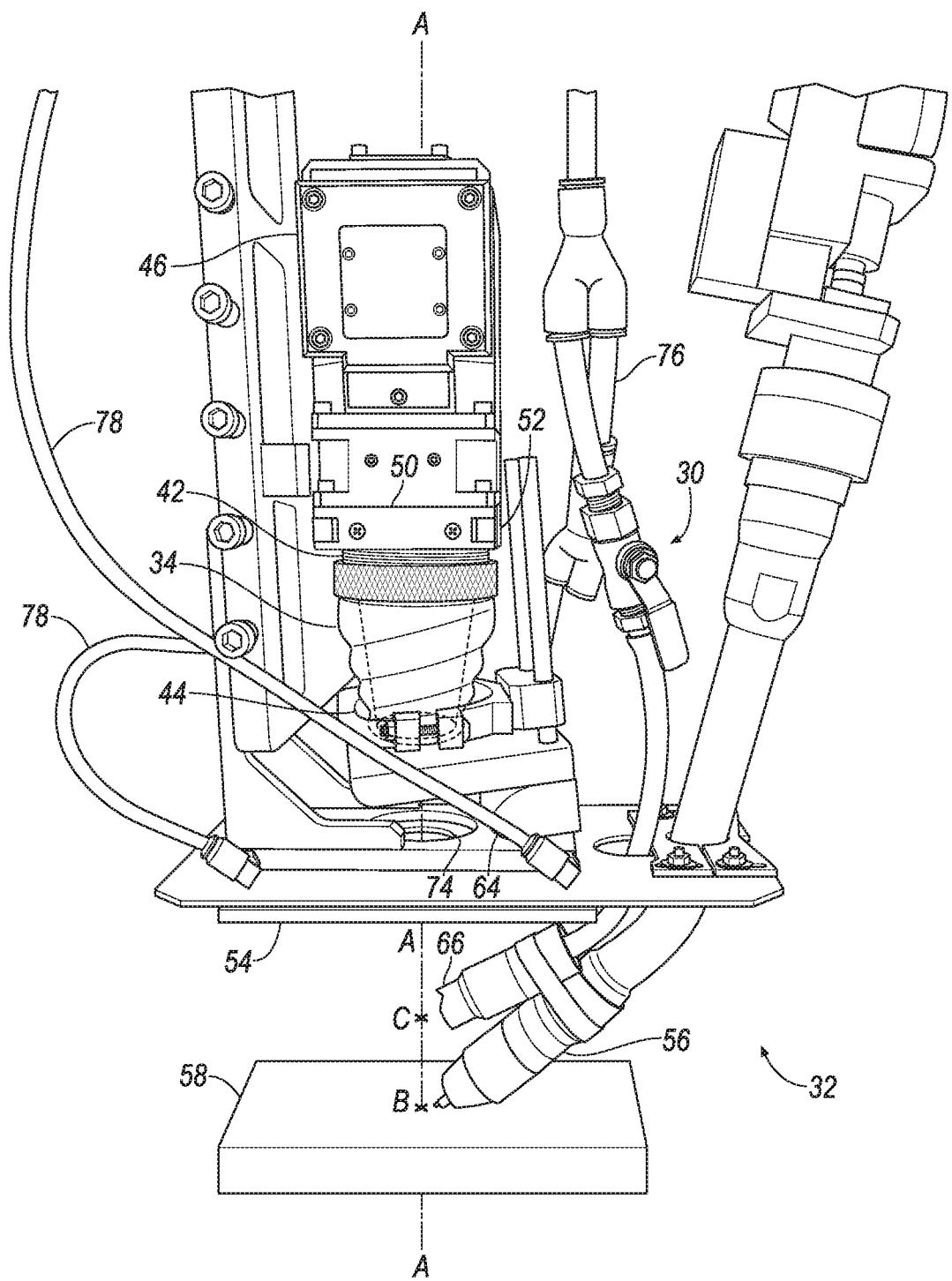
FIG. 2 is a front view of the additive-manufacturing apparatus of FIG. 1.

With reference to FIGS. 1 and 2, the additive-manufacturing apparatus 32 includes the laser 46, a cover-slide housing 52, the cover slide 50, the gas-dispersion apparatus 30, a plate 54, a source 56 of work material, and a substrate 58. The axis A may be oriented vertically. Some of the components of the additive-manufacturing apparatus 32 may be arranged along the axis A, including, typically in the order now listed: the laser 46, then the cover-slide housing 52 and cover slide 50, then the pipe 34 of the gas-dispersion apparatus 30, then the plate 54, and then the substrate 58. The laser 46 may be disposed above the cover-slide housing 52 and cover slide 50, which may both be disposed above the pipe 34, which in turn may be disposed above the plate 54, which may be disposed above the substrate 58.

The laser 46 may be positioned to emit a beam along the axis A. The laser 46 may be any type suitable for melting or sintering a work material, e.g., a $CO_2$ laser, a neodymium-doped yttrium aluminum garnet (Nd:YAG) laser, a Yb-doped fiber laser, an excimer gas laser, etc. The laser 46 may emit a beam with a diameter of approximately between 1 millimeter and 5 centimeters, more specifically between 4 and 12 millimeters.

With reference to FIG. 3, the cover-slide housing 52 is fixed relative to the laser 46. The cover-slide housing 52 may be attached, e.g., fastened, to the laser 46. The cover-slide housing 52 may be disposed below the laser 46 along the axis A. The cover-slide housing 52 may be shaped to receive the cover slide 50.

The cover slide 50 is removably insertable into the cover-slide housing 52; i.e., the cover slide 50 is removable from the cover-slide housing 52 without disassembling or damaging the cover slide 50 or cover-slide housing 52. For example, the cover slide 50 may include movable tabs 60 that are movable between a relaxed position (shown in FIG. 3) holding the cover slide 50 in the cover-slide housing 52, and a pushed position releasing the cover slide 50 from the cover-slide housing 52.

With reference to FIG. 4, the cover slide 50 includes the lens 48. The lens 48 may be a focusing lens. When the cover slide 50 is inserted into the cover-slide housing 52, the lens 48 may be positioned along the axis A, and the lens 48 may be positioned to focus the beam from the laser 46 at a first point B, e.g., at a point at which the source 56 of work material feeds work material to the substrate 58, shown in FIG. 2.

Figure 8:
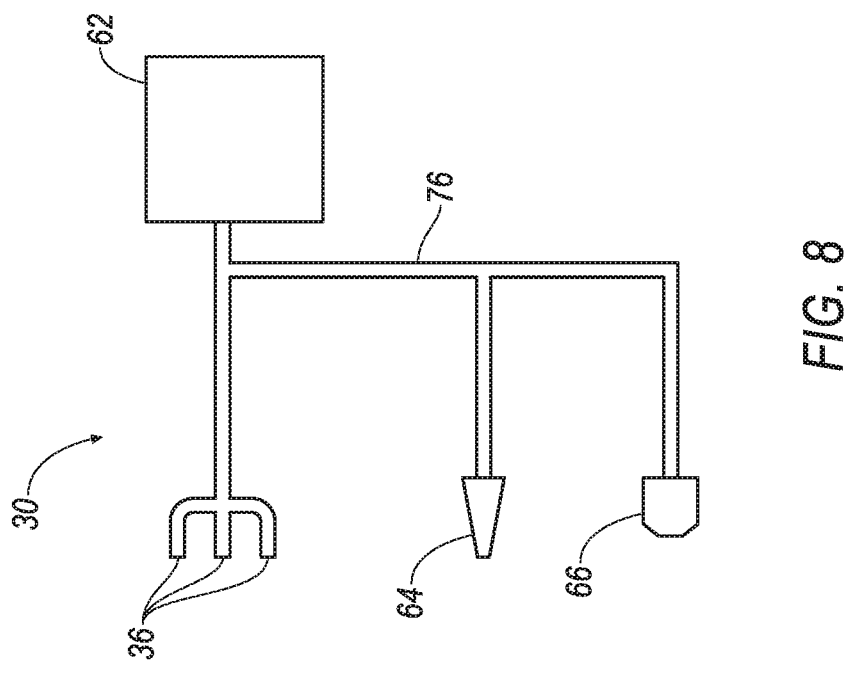
FIG. 8 is a diagram of a gas system of the additive-manufacturing apparatus of FIG. 1.
Figure 9:
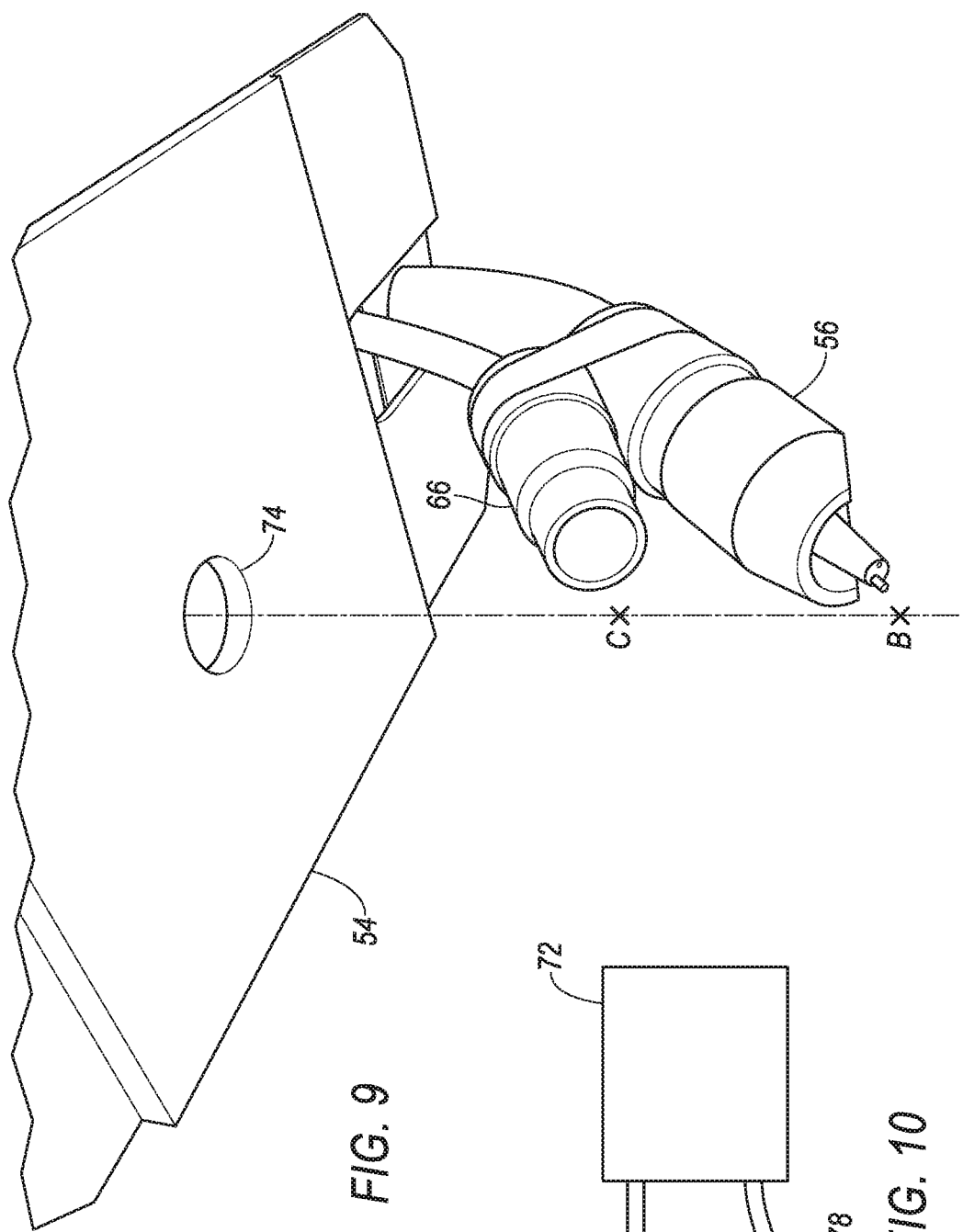
FIG. 9 is a bottom perspective view of a portion of the additive-manufacturing apparatus of FIG. 1.

With reference to FIG. 8, the gas-dispersion apparatus 30 includes a gas source 62, the outlets 36 (see also FIG. 5), the pipe 34 (see FIG. 5), an air-blade slot 64 (see also FIGS. 1 and 2), and a nozzle 66 (see also FIGS. 2 and 9). The gas source 62 may be a pressurized supply of a nonreactive gas, e.g., argon. The gas source 62 is fluidly connected to the outlets 36, the air-blade slot 64, and the nozzle 66, and the gas source 62 transmits gas to the outlets 36, the air-blade slot 64, and the nozzle 66, e.g., through gas tubing 76. The gas source 62 may provide, for example, approximately 500 liters of argon per minute to the outlets 36, the air-blade slot 64, and the nozzle 66. The gas tubing 76, the outlets 36, the air-blade slot 64, and the nozzle 66 may be sized so that approximately between 20% and 60%, e.g., approximately 40%, of the supplied argon travels through the outlets 36; approximately between 15% and 45%, e.g., approximately 30%, of the supplied argon travels through the air-blade slot 64; and approximately between 15% and 45%, e.g., approximately 30%, of the supplied argon travels through the nozzle 66. The outlets 36 discharge gas into the pipe 34.

Figure 5:
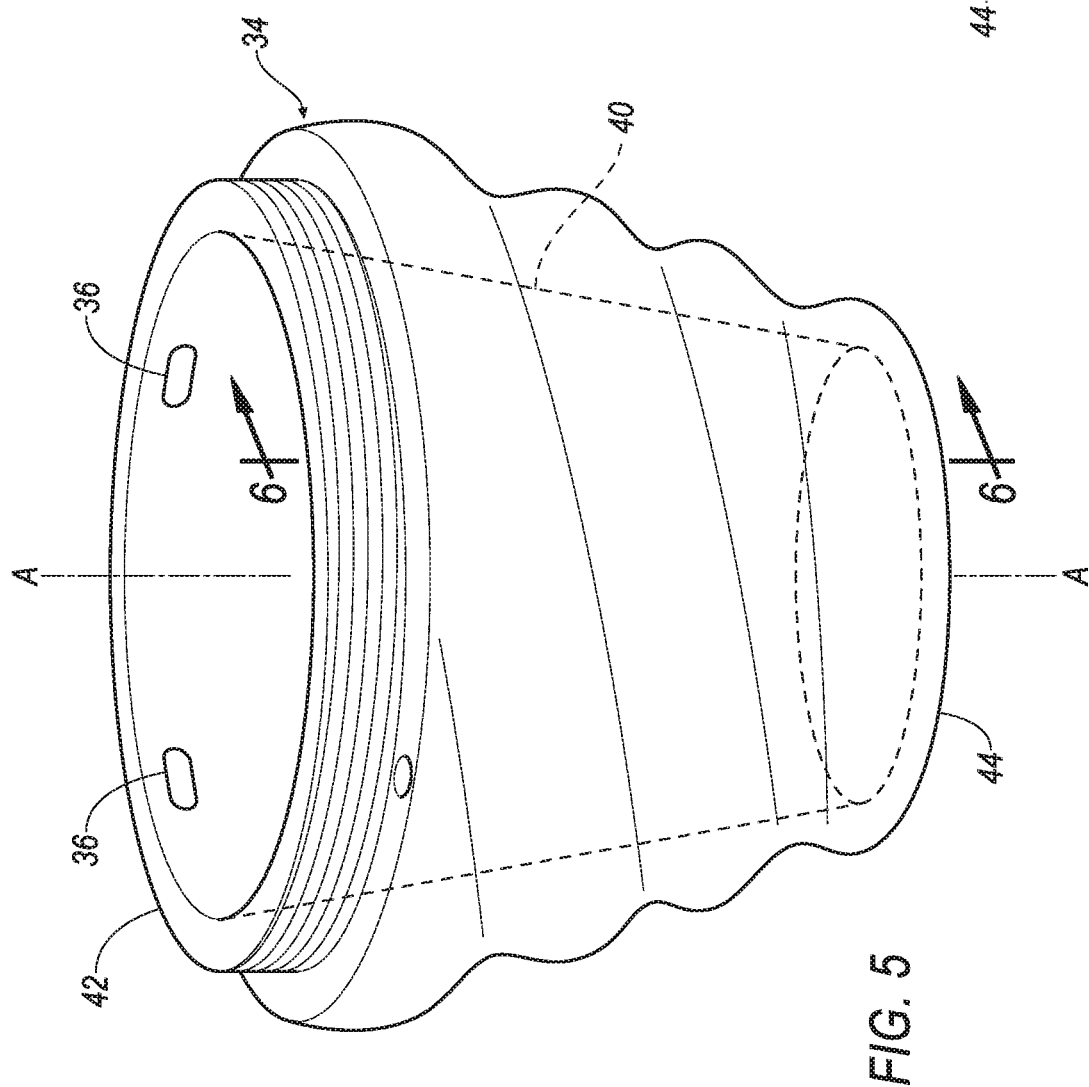
FIG. 5 is a perspective view of an example pipe of the additive-manufacturing apparatus of FIG. 1.

With reference to FIG. 5, the pipe 34 defines the axis A and extends along the axis A from the first end 42 to the second end 44. The first end 42 may be attachable to the laser 46. For example, the first end 42 may be directly attached to the cover-slide housing 52, and the cover-slide housing 52 may be directly attached to the laser 46. For example, the first end 42 may be threaded and may be screwed to the cover-slide housing 52. Alternatively, the first end 42 may be attachable to the cover-slide housing 52 by fasteners, by adhesive, etc. When the first end 42 is attached directly or indirectly to the laser 46, the second end 44 is farther from the cover-slide housing 52 than the first end 42, and the beam emitted by the laser 46 may travel through the passageway 40 along the axis A.

The passageway 40 extends along the axis A. A cross-sectional area of the passageway 40, i.e., an area of the passageway 40 orthogonal to the axis A, is smaller at the second end 44 than at the first end 42. For example, the diameter of the passageway 40 orthogonal to the axis A at the first end 42 may be approximately 50 millimeters, and the diameter of the passageway 40 orthogonal to the axis A at the second end 44 may be approximately 20 millimeters. The passageway 40 may be tapered from the first end 42 to the second end 44, i.e., may continuously narrow from the first end 42 to the second end 44.

At least one outlet 36, e.g., three outlets 36, may be fluidly connected to the gas source 62. The outlets 36 may be positioned to discharge gas into the passageway 40 at the first end 42. The outlets 36 may be substantially equally circumferentially spaced about the first end 42 of the pipe 34; e.g., for three outlets 36, each outlet 36 may be spaced 120° about the axis A from the other two outlets 36. The outlets 36 may be oriented to discharge gas in a swirling pattern in the passageway 40; i.e., the discharged gas may rotate about the axis A while traveling from the first end 42 to the second end 44. For example, the outlets 36 may be oriented in an at least partially circumferential direction relative to the pipe 34, i.e., in a direction that is partially radially inward and partially circumferential, i.e., neither parallel to nor at a right angle to a tangent of the circumference of the pipe 34. For example, the outlets 36 may be oriented at 30° from a tangent of the circumference of the pipe 34.

Figure 6:
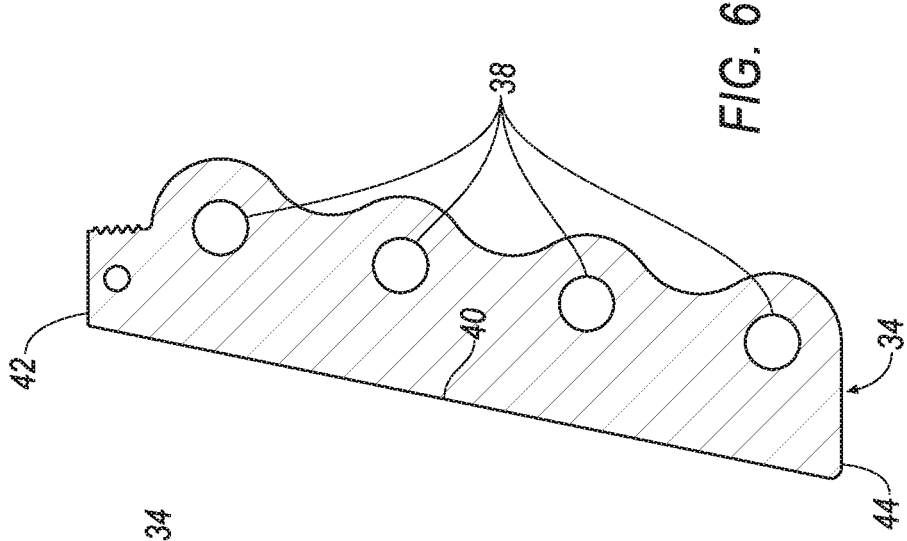
FIG. 6 is a cross-sectional view of the pipe of FIG. 5 along line 6-6.
Figure 7:
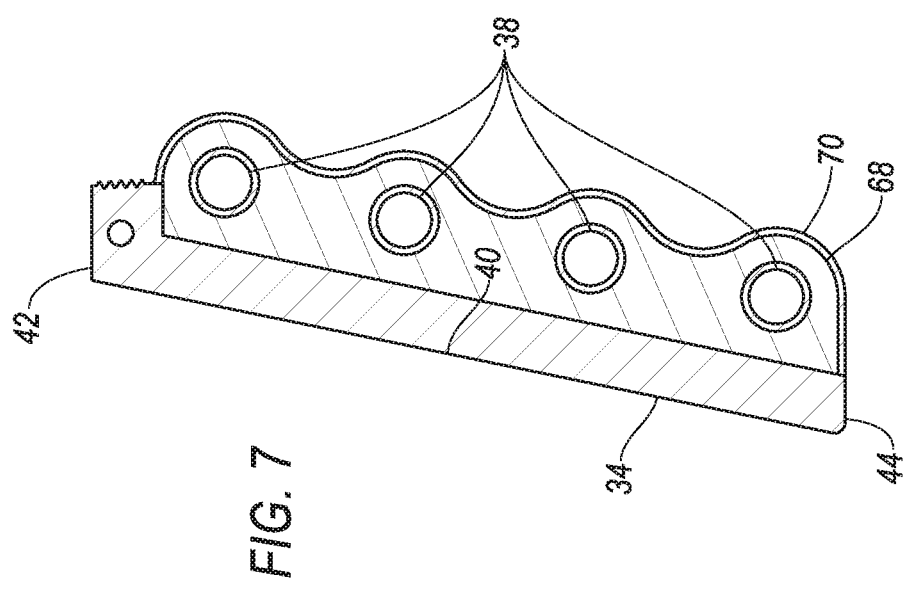
FIG. 7 is a cross-sectional view along line 6-6 of another example pipe of the additive-manufacturing apparatus of FIG. 1.

With reference to FIGS. 6 and 7, the cooling tube 38 is coiled about the pipe 34. For example, the cooling tube 38 may have a spiral shape about the axis A and extending axially between the first end 42 and the second end 44. The pipe 34 and the cooling tube 38 may be integral, i.e., formed as a single continuous piece with no seams, as shown in FIG. 6. Alternatively, the cooling tube 38 may be coiled external to the pipe 34, as shown in FIG. 7. The cooling tube 38 may be formed of any suitable thermally conductive material, e.g., braised copper. A filler material 68 may thermally connect the cooling tube 38 to the pipe 34, i.e., provide a high thermal conductance between the cooling tube 38 and the pipe 34. The filler material 68 may be, e.g., liquid metal or any other suitable material with a high thermal conductivity. An insulator 70 may cover the filler material 68.

Figure 10:
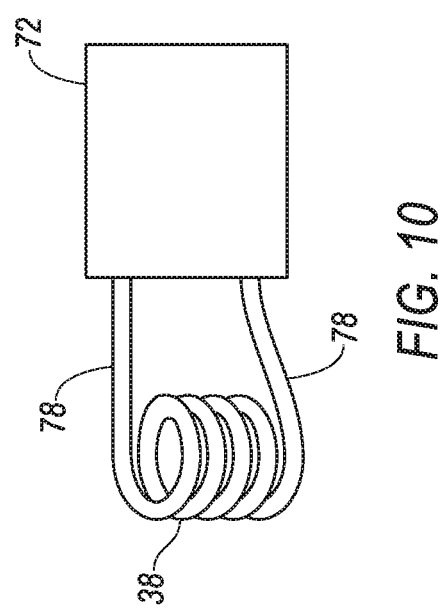
FIG. 10 is a diagram of a cooling system of the additive-manufacturing apparatus of FIG. 1.

With reference to FIG. 10, the cooling tube 38 is attachable to a coolant source 72. The coolant source 72 feeds into the cooling tube 38, e.g., via cooling hoses 78 as shown in FIGS. 1A-2. The coolant source 72 circulates coolant through the cooling tube 38. The coolant source 72 cools the coolant received from the cooling tube 38. The coolant may be, e.g., water or refrigerant. For example, the coolant source 72 may supply approximately 0.5-1.5 liters of water per minute through the cooling tube 38.

With reference to FIG. 1, the air-blade slot 64 is fluidly connected to the gas source 62. The air-blade is aimed at the axis A between the pipe 34 and the plate 54. The air-blade slot 64 is shaped to discharge a flat stream of gas across the axis A. The gas discharged by the air-blade slot 64 may blow away debris caused by the additive-manufacturing process, preventing the debris from traveling to the lens 48 or the laser 46.

With reference to FIG. 9, the plate 54 is disposed between the pipe 34 and the source 56 of work material. The plate 54 may be fixed relative to the cover-slide housing 52 and the laser 46. The plate 54 may be oriented orthogonally to the axis A. The plate 54 may include a hole 74 positioned to permit a beam from the laser 46 to pass through.

The source 56 of work material feeds work material to the first point B, i.e., the point at which the lens 48 focuses the beam from the laser 46. The work material may be any suitable material meltable or sinterable by the laser 46. For example, the work material may be a metal wire, and the source 56 of work material may be a wire feed. The source 56 of work material may be disposed below the plate 54.

With reference to FIG. 1, the substrate 58 is the material to which the work material is fused by the laser 46. The substrate 58 may be movable in three dimensions relative to the plate 54 and the laser 46.

With reference to FIG. 9, the nozzle 66 is fluidly connected to the gas source 62. The nozzle 66 is fixed relative to, e.g., attached to, the source 56 of work material. The nozzle 66 is aimed at the axis A and discharges gas toward the axis A. The nozzle 66 may be aimed at a second point C on the axis A between the first point B and the second end 44 of the pipe 34. The second point C may be located slightly above the first point B. The gas discharged by the nozzle 66 may blow away debris caused by the additive-manufacturing process, preventing the debris from traveling to the lens 48 or the laser 46. The gas discharged by the nozzle 66 may also blow the plume caused by the laser 46 partially sideways so that less heat produced by the plume travels upward to the lens 48 and the laser 46.

With reference to FIG. 1, in operation, the laser 46 emits a beam that the lens 48 focuses on the first point B. The source 56 of work material outputs work material, such as a wire, at the first point B, which the laser 46 melts or sinters onto the substrate 58. The nozzle 66 and the air-blade slot 64 both discharge gas from the gas source 62 that blows away debris produced as a result of fusing the work material to the substrate 58. The gas source 62 supplies gas to the outlets 36 that is discharged into the first end 42 of the pipe 34 with a swirling pattern. As the gas travels from the first end 42 to the second end 44, the pressure of the gas increases because the passageway 40 tapers. The increasing pressure and the swirling pattern help to prevent any remaining debris from traveling up the pipe 34 toward the lens 48 or the laser 46. The cooling tube 38 cools the gas traveling through the passageway 40 and reduces the amount of waste heat from fusing the work material from traveling to the lens 48 or the laser 46.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A gas-dispersion apparatus for an additive-manufacturing apparatus, comprising:

a pipe defining an axis and including a passageway inside the pipe along the axis, wherein the pipe extends from a first end to a second end, wherein the passageway continuously narrows from the first end to the second end;

a plurality of outlets positioned to discharge gas into the passageway at the first end, wherein the plurality of outlets are oriented to discharge gas in a swirling pattern in the passageway; and a cooling tube coiled about the pipe outside the passageway, wherein the coiled cooling tube extends axially from the first end to the second end;

wherein the first end is attachable to a laser so that a beam emitted by the laser travels along the axis; and the pipe and the cooling tube are a single continuous piece.

2. The gas-dispersion apparatus of claim 1, wherein the pipe and the cooling tube are integral.

3. The gas-dispersion apparatus of claim 1, wherein the cooling tube is attachable to a coolant source.

4. The gas-dispersion apparatus of claim 1, wherein the plurality of outlets are fluidly connectable to a source of pressurized nonreactive gas.

5. The gas-dispersion apparatus of claim 4, further comprising a nozzle fluidly connectable to the source of pressurized nonreactive gas and attachable to a source of work material.

6. The gas-dispersion apparatus of claim 5, wherein the nozzle is aimed at the axis.

7. The gas-dispersion apparatus of claim 4, further comprising an air-blade slot fluidly connectable to the source of pressurized nonreactive gas.

8. The gas-dispersion apparatus of claim 7, wherein the air-blade slot is aimed at the axis.

9. The gas-dispersion apparatus of claim 4, wherein the nonreactive gas is argon.

10. The gas-dispersion apparatus of claim 1, wherein the plurality of outlets are oriented in an at least partially circumferential direction relative to the pipe.

11. The gas-dispersion apparatus of claim 1, wherein the plurality of outlets are equally circumferentially spaced about the first end of the pipe.

12. The gas-dispersion apparatus of claim 1, wherein the cooling tube has a spiral shape about the axis.

13. The gas-dispersion apparatus of claim 1, wherein the plurality of outlets are oriented in a direction that is partially circumferential and partially radially inward relative to the pipe.

14. The gas-dispersion apparatus of claim 1, wherein the cooling tube has a spiral shape about the axis and extends axially from a first terminus of the pipe at the first end of the pipe to a second terminus of the pipe at a second end of the pipe.

* * * * *